(12) United States Patent
Ono et al.

(10) Patent No.: US 6,452,649 B1
(45) Date of Patent: Sep. 17, 2002

(54) FLAT SURFACE ILLUMINATION DEVICE, LIQUID CRYSTAL DISPLAY PANEL AND LIQUID CRYSTAL DISPLAY DEVICE

(75) Inventors: Masaki Ono, Sagamihara; Mikio Suzuki, Fujisawa; Masanori Mori, Hino, all of (JP)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 09/617,282

(22) Filed: Jul. 17, 2000

(30) Foreign Application Priority Data

Jul. 16, 1999 (JP) ............................. 11-202695

(51) Int. Cl.$^7$ ...................... G02F 1/1333; G02F 1/1345
(52) U.S. Cl. .............................. 349/61; 349/60; 349/62; 362/31
(58) Field of Search ............................. 349/60, 61, 62, 349/63, 65, 58; 362/31

(56) References Cited

U.S. PATENT DOCUMENTS

| | | | | |
|---|---|---|---|---|
| 5,664,873 A | * | 9/1997 | Kanda et al. ................. | 362/97 |
| 5,808,707 A | * | 9/1998 | Niibori et al. ................. | 349/60 |
| 6,055,029 A | * | 4/2000 | Kurihara et al. ............... | 349/60 |
| 6,206,535 B1 | * | 3/2001 | Hattori et al. ................. | 362/31 |
| 6,309,081 B1 | * | 10/2001 | Furihata ....................... | 362/31 |
| 6,379,016 B1 | * | 4/2002 | Boyd et al. .................... | 362/31 |

FOREIGN PATENT DOCUMENTS

JP 318936 5/1994

* cited by examiner

Primary Examiner—Toan Ton
Assistant Examiner—Hoan Nguyen
(74) Attorney, Agent, or Firm—Scully, Scott, Murphy & Presser; Marian Underweiser

(57) ABSTRACT

In a flat surface illumination device or a liquid crystal display panel, with an aperture disposed in a frame or a case, comprising a circumferential section in which a central section receiving and supporting the light guide and the like is removed, a warp preventing means is formed in such a manner to cross the aperture. The warp preventing means comprises a long and narrow zonal thin plate in which two or more beading processes are performed.

16 Claims, 5 Drawing Sheets

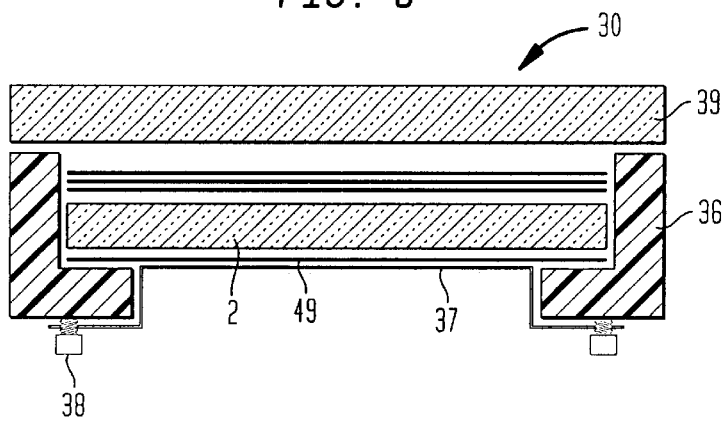
FIG. 6
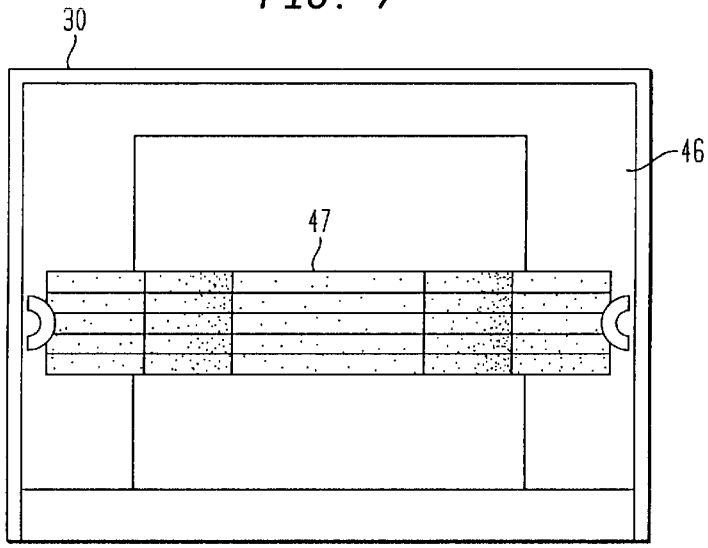
FIG. 7
FIG. 8
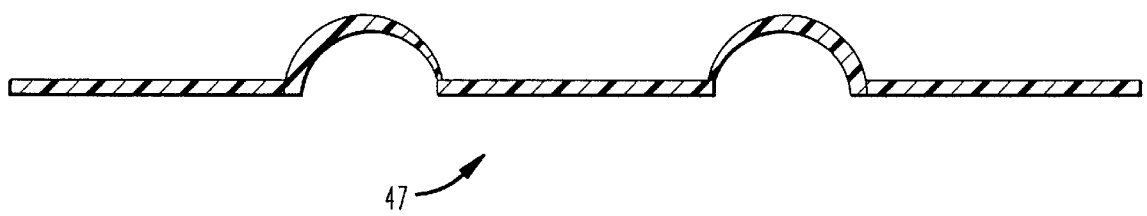

FLAT SURFACE ILLUMINATION DEVICE, LIQUID CRYSTAL DISPLAY PANEL AND LIQUID CRYSTAL DISPLAY DEVICE

BACKGROUND OF THE INVENTION

1. Technical Field

The present invention relates to a flat surface illumination device and a liquid crystal display panel capable of compensating and preventing warp caused by change of temperature, humidity and the like of a light guide.

2. Prior Art

In the conventional flat surface illumination device, a line light source, a light guide, a reflecting sheet and the like have been accommodated in a plastic case and, in some cases, an aperture has been formed by cutting off a part of the plastic case for lightening weight thereof. And, a frame or a case with a reinforcing frame disposed in a cross shape on the back of the light guide has been used.

A variety of kinds of light guides have been used. However, a flat plate with a little warp and a uniform thickness or a wedge-shaped light guide manufactured by casting process has been used when warp of a light guide is required to be decreased as much as possible, e.g., in a large flat surface illumination device of 13 inch or more.

In Japanese Patent Laid-Open Hei 7 (1995)-318936, a technology for diffusing heat uniformly, decreasing luminance unevenness caused by a reflecting sheet and protecting the reflecting sheet by disposing a metal plate on the back of the light guide is disclosed. It is also disclosed that a metal plate may be disposed near or on only a part outside a reflecting sheet.

It has been found that in case that a part of a plastic case is cut off, the light guide is supported only by a circumferential section, so that warp of the light guide is caused by weight itself.

In case of a large flat surface illumination device of 13 inch or more, increase of the length in a longitudinal direction causes warp in the longitudinal direction. In this case, a flat plate with a uniform thickness has been used in order to decrease warp of a light guide as much as possible. However, as a display area size of a liquid crystal display device used in a portable personal computer and the like has been recently enlarged, needs for lightening weight of a flat surface illumination device has occurred and a problem of weight has been presented. A method of manufacturing a flat plate with a uniform thickness is generally a method of cutting from a large resin plate. This method presents a problem in productivity. Moreover, when a conventional flat surface illumination device using a large wedge-shaped light guide for lightening weight thereof is manufactured by a casting process, the problem is presented that it takes long time for the whole to be cured after basic material resin and curing agent are injected into a metallic mold of a wedge-shaped light guide. In some cases, a flat plate or a casting light guide of this kind can not completely prevent warp.

Furthermore, in a method of preventing warp from the back side of a light guide with a reinforcing frame disposed in a cross shape in a frame or a case, in some cases, the whole warps in the same direction because of the same material and at the same time mechanical strength depends on the thickness of a resin. In this method, the problem for light weight and strengthening is presented. Moreover, especially to enlarge a flat surface illumination device, a body of a frame or a case is tapered according to a shape of a wedge-shaped light guide. In this case, the problem for strength is presented.

SUMMARY OF THE INVENTION

A flat surface illumination device of the present invention comprises a line light source, a light guide guiding a light ray from the line light source, a plastic frame with an aperture supporting the line light source and the light guide, a warp preventing means made of inorganic material attached to the plastic frame in such a manner that it crosses the aperture. The aperture is formed so as to include a part corresponding to a position of center of gravity of the light guide. The area of the aperture is 25ç or more, 50ç or more, or 90ç or more of the area of the light guide surface adjacent to the plastic frame in the light guide. A warp preventing means is, e.g., metallic material or ceramic material. A flat surface illumination device of the present invention may include at least one optical sheet in a group constituting a light condensing sheet, a light reflecting sheet, a light diffusing sheet and a light polarizing sheet.

A flat surface illumination device of the present invention can prevent warp of a light guide by inserting a warp preventing means made of metallic material, in the longitudinal direction from an incident end surface section to a reflecting end surface section, between the back side of the light guide and the frame or the case.

In a flat surface illumination device of the present invention, the warp preventing means comprises a long and narrow zonal thin plate, corresponding to the length in a longitudinal direction of the light guide, in which at least two beading processes are performed in the longitudinal direction and/or a perpendicular bending process is performed at both ends in the longitudinal direction. The warp preventing means makes it possible to produce a light and thin flat surface illumination device with an adequate mechanical strength.

In a flat surface illumination device of the present invention, a step-difference process is performed in at least one of the ends of the zonal thin plate in the longitudinal direction. Accordingly, it is possible to produce a light and thin flat surface illumination device with an adequate mechanical strength as well as easily attachable to a frame or a case.

In a flat surface illumination device of the present invention, a beading process is performed in the ratio of the width processed by the beading to the width of the zonal thin plate ranging from 1:2.3 to 1:5. Accordingly, it is possible to freely select a required mechanical strength according to the allowable width of the zonal thin plate.

In a flat surface illumination device of the present invention, a bending process where the length of a perpendicularly bent section is 1 to 5 times as large as the thickness of the zonal thin plate is used. Accordingly, it is possible to freely select a required mechanical strength according to the allowable width of the zonal thin plate.

In a flat surface illumination device of the present invention, a plastic frame or case comprises a concavity accommodating an end of a zonal thin plate of the warp preventing means in a position corresponding to an incident end surface section and a reflection surface end section of the light guide and/or an aperture into which the end of the zonal thin plate is inserted. Accordingly, it is possible for the zonal thin plate of the warp preventing means to be fixed and removed easily and for the number of zonal thin plates of the warp preventing means to be adjusted according to use.

A flat surface illumination panel of the invention comprises a line light source, a light guide guiding a light ray from the line light source, a liquid crystal display element selectively transmitting the light ray from the light guide, a plastic frame with an aperture supporting the line light source and the light guide, a warp preventing means made of inorganic material attached to the plastic frame in such a manner that it crosses the aperture. A liquid crystal display panel of the invention comprises a line light source, a light guide guiding a light ray from the line light source, a liquid crystal display element selectively transmitting light ray from the light guide, a plastic frame, with an aperture, supporting the line light source and the light guide, a metal bezel supporting the plastic frame, a warp preventing means made of inorganic material attached to the metal bezel in such a manner that it crosses the aperture. A liquid crystal display device of the invention comprises a line light source, a light guide guiding a light ray from the line light source, a liquid crystal display element selectively transmitting the light ray from the light guide, a plastic frame, with an aperture, supporting the line light source and the light guide, a metal bezel supporting the plastic frame, an outer lid supporting the metal bezel, a warp preventing means made of inorganic material attached to the outer lid in such a manner that it crosses the aperture.

BRIEF DESCRIPTION OF THE DRAWINGS

Preferred embodiments of the present invention will now be described, by way of example only, with reference to the accompanying drawings in which:

FIG. 6 is a cross sectional view of the liquid crystal display panel of the present invention.

FIG. 7 is a plan view of the liquid crystal display panel of the present invention.

FIG. 8 is a cross sectional view of the warp preventing means of the present invention.

DETAILED DESCRIPTION OF THE PREFERRED EMBODIMENTS OF THE INVENTION

Description will be made for the preferred embodiment of the present invention with reference to the accompanying drawings.

Figure 1:
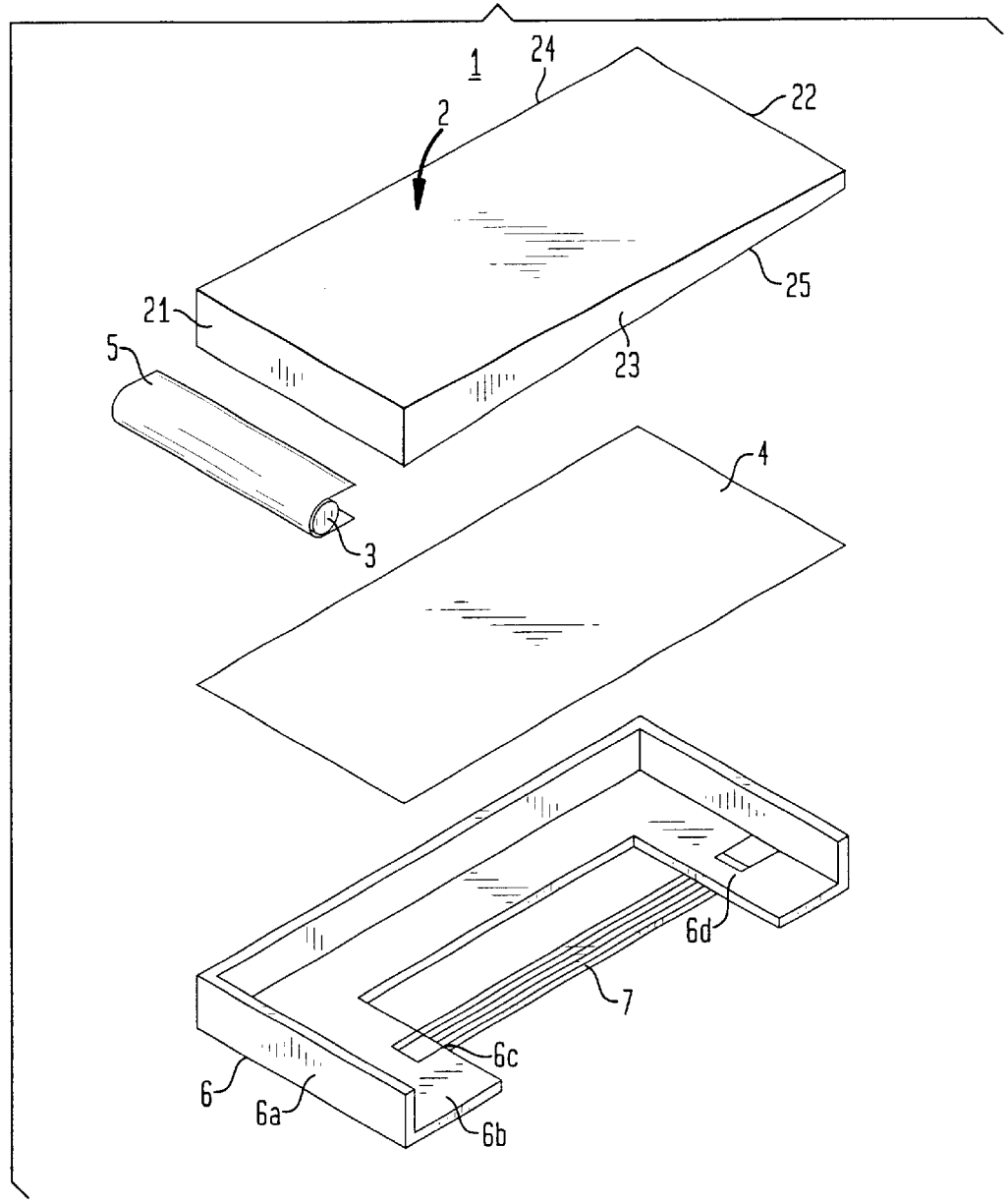
FIG. 1 is a schematic perspective exploded view of the flat surface illumination device of the present invention.

FIG. 1 is a schematic perspective view of one embodiment according to the present invention explaining the decomposed version of the flat surface illumination device. FIG. 1 shows a light guide 2, a line light source 3, a reflecting sheet 4, a reflector 5, a frame 6 or a case 6, and a warp preventing means 7. The light guide 2 is formed by injection molding of a transparent acrylic resin (PMMA) with a refractive index of the extent of 1.4 to 1.7, a polycarbonate resin (PC) and the like. The light guide is wedge-shaped from an incident end surface section 21, guiding light from the line light source 3, to the reflecting end surface section 22. As an incident light ray goes through the light guide 2, a reflection angle is decreased because of the taper (becomes more perpendicular to the light guide surface) and at last light is emitted from the front 24 owing to violation of a critical angle. Moreover, white dots may be printed or minute concavities and convexities may be formed on the underside of the light guide. In this case, light is emitted from the front 24 or the back 25 because of diffusion and reflection caused by collision of light with white dots or minute concavities and convexities. Light ray emitted after traveling in the direction of the back 25 of the light guide 2 is reflected by the reflecting sheet 4 disposed under the back 25 and is again inputted into the light guide 2.

A line light source is a line-shaped CFL (a cold-cathode fluorescent tube) and the like. Direct light is incident from the incident end surface section 21 into the light guide 2 and other light is again incident, being reflected by the reflector 5, into the light guide 2 through space between the line light source 3 and the reflector 5.

A reflecting sheet 4 is a sheet comprising a thermoplastic resin mixed with white material such as titanium oxide, a sheet made by metallic deposition using aluminum and the like or lamination of metallic foil on a sheet of a thermoplastic resin, sheet-shaped metal and a special polyethylene sheet whitened by foaming polyethylene. The reflecting sheet 4 surrounds the area except the incident end surface section 21 and the front 24, and typically covers only the back 25. Light from the line light source 3 except light emitted from the front 24 after proceeding through the light guide 2 is reflected or irregularly reflected by the reflecting sheet 4 and the like and is again incident into the light guide 2. Consequently, the whole of light from the line light source 3 is emitted from the front 24.

A reflector 5 is made of a sheet evaporated with white insulating material, or with reflective metal like aluminum, and/or metal and the like, surrounds the incident end surface section 21 of the light guide 2 and the line light source 3, reflects light from the line light source 3 and directs reflected light toward the incident end surface section 21 of the light guide 2.

A frame 6 or a case 6 is made of polycarbonate resin (PC), ABS resin, liquid crystal polymer resin and the like. The frame 6 or the case 6 with a circumferential section 6a and a bottom 6b accommodates and supports the light guide 2, the line light source 3, the reflecting sheet 4 and the reflector 5.

A frame 6 or a case 6 has an aperture, i.e., a part of the bottom 6b is cut for lightening weight. When an aperture is disposed at the bottom 6b in such a manner that it includes the area corresponding to the position of center of gravity of the light guide, the warp preventing means 7 of the present invention functions especially effectively. As shown in FIG. 1, the aperture is rectangle. When the length of each side of the aperture is more than one half of the length of each side of the bottom 6b, an aperture ratio is over 25ç, and in some cases, a position of center of gravity corresponds to an aperture. In this case, the light guide is apt to be warped. When an aperture ratio is over 50ç, the area supported by the bottom 6b is less than half of the area of the light guide 2 and warp in the light guide 2 becomes conspicuous. When an aperture ratio is over 90ç, warp in the light guide 2 becomes extremely conspicuous.

As for a method of fixing a warp preventing means 7 to a frame 6 or a case 6, any method will do, if it is simple and guarantees firm fixation. There are some fixing methods such as fixing with a pressure sensitive double adhesive coated tape, fixing by insertion of the warp preventing means 7 into a slit or a concavity or an interposing section and the like formed in the frame 6 or the case 6, fixing with a screw and the like. In FIG. 1, a concavity 6c and a slit 6d are formed at the back 6b and the end of the zonal thin plate of the warp preventing means 7 is inserted through the slit 6d into the concavity 6c. Besides the method of fixing with the concavity 6c and the slit 6d, in the method of fixing with two concavities 6c formed symmetrically, both edges of the warp preventing means 7 may be put in the two concavities before the light guide 2 and the like being inserted. As not shown in the drawings, when a plurality of the concavities 6c and the slits 6d are arranged so that a plurality of the zonal thin plates of the warp preventing means 7 can be inserted, therefore the number of the zonal thin plats can be adjusted according to required stress determined by the size of the light guide 2, the ratio of thickness and the ratio of length of the wedge.

As for the direction in which the warp preventing means is equipped, any direction will do, but the longitudinal direction of the light guide is generally selected, as the warp created in the direction in which conspicuous warp of the light guide is apt to appear has to be decreased.

A warp preventing means 7 takes the form of a long and narrow zonal thin plate. To increase strength against twisting and bending of the warp preventing means, at least two or more beading processes in the longitudinal direction or perpendicularly bending of both ends in the longitudinal direction may be performed. Increasing strength of the warp preventing means is useful for not only prevention of warp of the light guide but also enhancement of strength in the frame 6 or the case 6. The warp preventing means 7 is desirably made of inorganic material, e.g., metal material or ceramic material.

Figure 2:
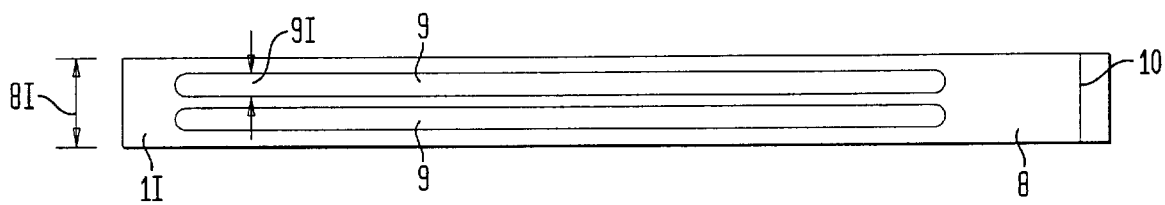
FIG. 2 is a plan view of the zonal thin plate, processed by beading, of the warp preventing means of the present invention.

FIG. 2 is a plan view showing one example of a warp preventing means. In FIG. 2, a warp preventing means 7 takes the form of a long and narrow zonal thin plate 8 and beading processes 9 are performed on it. The zonal thin plate is made of metal material such as thin stainless steel of, e.g., 0.2 mm in thickness and the beading process with the ratio of the width processed by the beading to the width of the zonal thin plate ranging from 1:2.3 to 1:5 is used. The beading process makes it possible to freely select a required mechanical strength according to the width of the zonal thin plate to be permitted. A step-difference process is performed in at least one of the ends of the zonal thin plate and the zonal thin plate is fixed by being inserted into the concavity 6c disposed in the bottom 6b of the frame 6 or the case 6. As for the other end 11 without a step-difference process 10, a pressure sensitive adhesive double coated tape and the like may be used for fixation.

In the zonal thin plate 8, with central unprocessed section of the extent of 4 mm to the zonal thin plate of 19 mm in width being left and the ratio of 1:3.8 set, the beading process 9 in a circular arc of 5.5R with the processed width 91 of 5 mm makes it possible to prevent warp of the light guide 2. When the length of the light guide 2 is 270 mm, its weight is the extent of about 8.18 g on the assumption that specific gravity of stainless steel is 7.98. When the zonal thin plate 8 is integrated with the frame 6 or the case 6 or is formed by resin, e.g., polycarbonate resin of specific gravity of 1.29 with the thickness of 1.69 mm being the same as the thickness of the bottom 6b of the frame 6 or the case 6 and the like, the weight becomes about 11.28 g.

Figure 3:
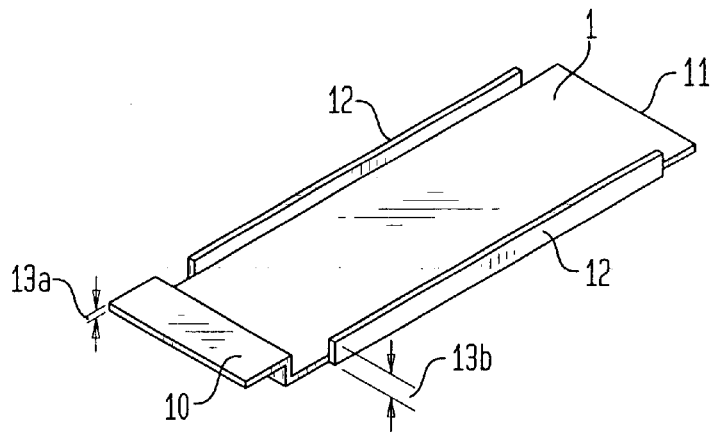
FIG. 3 is a perspective view of the zonal thin plate, processed by bending, of the warp preventing means of the present invention.

FIG. 3 is a perspective view of one embodiment according to the invention showing the zonal thin plate processed by bending in warp preventing means. As shown in FIG. 3, the long and narrow zonal thin plate 8 of the warp preventing means 7 is made of metallic material such as a thin stainless steel plate of the extent of 0.2 mm in thickness. In the bending process 12, the length of a perpendicularly bent section 12b is 1 to 5 times as large as the thickness 12a of the zonal thin plate. The bending process makes it possible to freely select a required mechanical strength according to the width of the zonal thin plate to be permitted.

With both ends 10, 11 of the extent of 15 mm to the zonal thin plate of 15 mm in width being left, the bending process 12, in which the width of bending process 12 is 2.5 times the thickness 12a of the zonal thin plate and the perpendicular bent section 12b is erected by 0.5 mm, makes it possible to prevent warp of the light guide 2, realize light weight as compared with polycarbonate resin and the like in the same way as the beading process 9 and possess adequate strength.

A step-difference process is performed in at least one of the ends of the zonal thin plate and the zonal thin plate is fixed by being inserted into the concavity 6c disposed in the bottom 6b of the frame 6 or the case 6. As for the other end 11 without a pressure sensitive adhesive double coated tape and the like may be used for fixation. A beading process 9 and a bending process 12 are shown respectively in FIG. 2 and FIG. 3, but both processes may be performed on one zonal thin plate 8. Choice among three processes is determined based on balance between size of the zonal thin plate 8 and required mechanical strength.

The zonal thin plate 8 is made of metallic material. As coefficient of line expansion of stainless steel and acrylic resin is respectively $8 \varsigma 10^{-6}$, $16.4 \varsigma 10^{-6}$, pressure caused by the zonal thin plate 8 to the frame 6 or the case 6 itself or the concavity 6c or the aperture 6d will not become excessive because of relatively small degree of change in the zonal thin plate 8. Moreover, since modulus of elasticity of metallic material such as stainless steel and acrylic resin is respectively the extent of 15 to $21 \varsigma 10^{10}$ and 25 to $35 \varsigma 10^8$, warp of the light guide can be prevented fully.

In the flat surface illumination device of the present invention, an optical sheet such as a light condensing sheet, a light reflecting sheet, a light diffusing sheet, a light polarizing sheet may be used. In case of an optical sheet except a light condensing sheet, unevenness of light is not so remarkable because of diffusion of light, the degree of which differs, even if warp was more or less created in the light guide. However, in case of a light condensing sheet, enhancement of unevenness of light degrades appearance extremely. Consequently, in case of a flat surface illumination device with a light condensing sheet, the warp preventing means of the present invention is especially needed.

Figure 4:
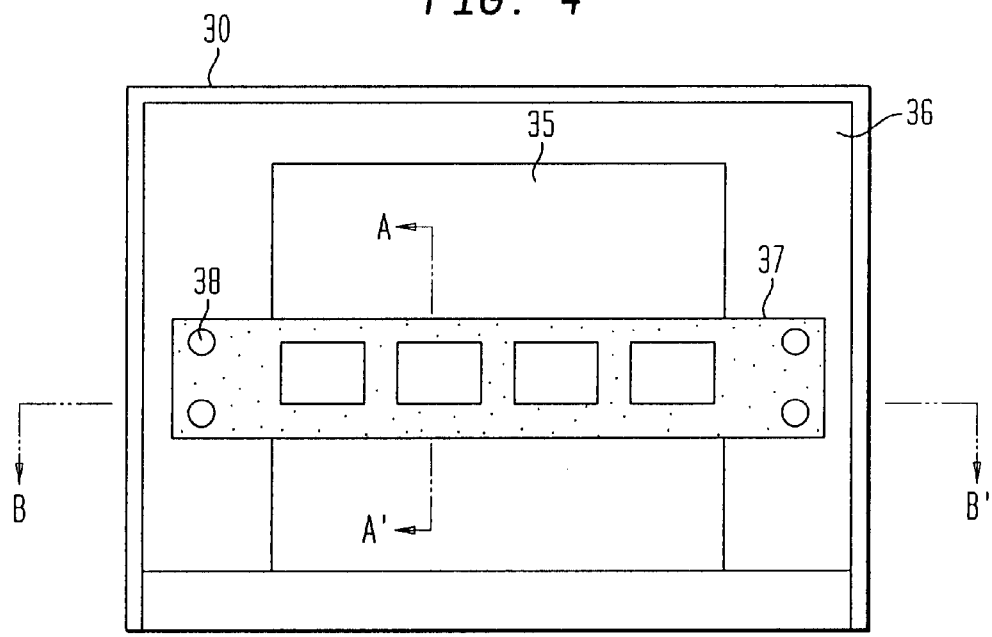
FIG. 4 is a plan view of the liquid crystal display panel of the present invention.
Figure 5:
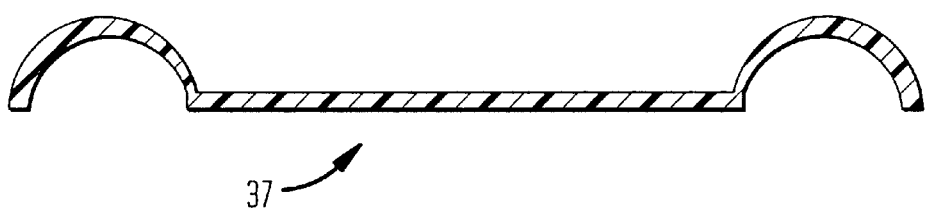
FIG. 5 is a cross sectional view of the warp preventing means of the present invention.
Figure 9:
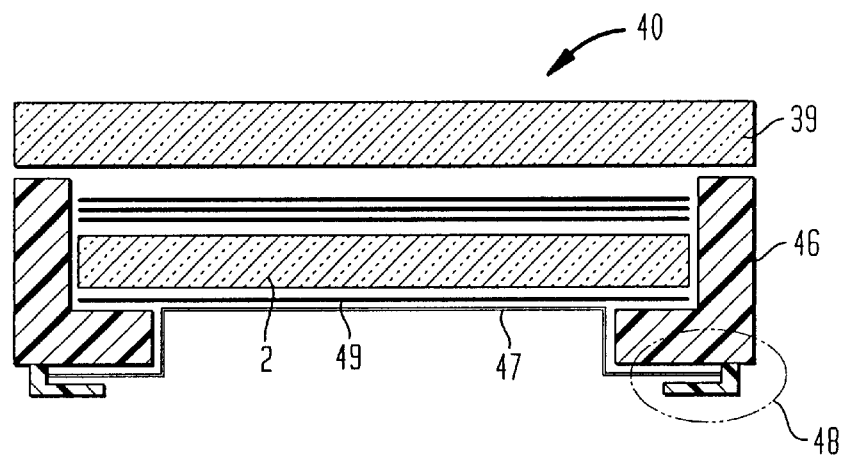
FIG. 9 is a cross sectional view of the liquid crystal display panel of the present invention.

An experimental result in respect to a liquid crystal display module using a warp preventing means of the present invention will be described below. FIG. 4 is a plan view of the liquid crystal display module 30 (Sample No. 1) of the present invention observed from the opposite side of an image display area. FIG. 5 is a cross sectional view of the warp preventing means in line A–A'. FIG. 6 is a cross sectional view of a liquid crystal display module 30 in line B–B' with the warp preventing means 37 being situated downward. In FIG. 4, the warp preventing means 37 is ladder shape and the frame 36 is cut shape with an aperture formed therein. In FIG. 6, the warp preventing means 37 and the frame 36 are fixed by a screw 38. The warp preventing means 37 supports the light guide 2. The reflecting sheet 49 is disposed on the back of the light guide 2. The liquid crystal glass 39 comprises two glass plates, liquid crystal material inserted between two glass plates, an electrode formed on the surface of the glass plate and the like FIG. 7 is a plan view of a liquid crystal display module 40 (Sample No. 2) of the present invention. FIG. 8 is a cross sectional view of the warp preventing means 47. FIG. 9 is a cross sectional view of the liquid crystal display module 40. A beading process is performed in the warp preventing means 47. The warp preventing means 47 is fixed in the frame by being interposed in the interposing section 48 formed on the frame 46. For comparison, a sample (Sample No. 3), which is the same as Sample No. 1 and Sample No. 2 except that it has not the warp preventing means is prepared.

In any sample, quantity of warp was 0.0 mm before experiment. After three samples were conserved for 300 hours in an environment with 50 degree and 80 and left for 2 hours in an environment with 25 degree and 50 quantity of warp in a light guide was measured respectively. In measuring quantity of warp, quantity of elevation created, by pressing one corner, in the other diagonal corner opposing to one corner with a light guide incorporated in a liquid crystal display panel without disassembling sample was measured at four corners and four quantities were added. After experiment, quantity of warp in Sample No. 1, Sample No. 2, Sample No. 3 was 0.0 mm, 0.4 mm, 3.4 mm respectively. In Sample No. 1 and Sample No. 2, no image degradation was observed, but, in Sample No. 3, unevenness of light occurred.

Figure 10:
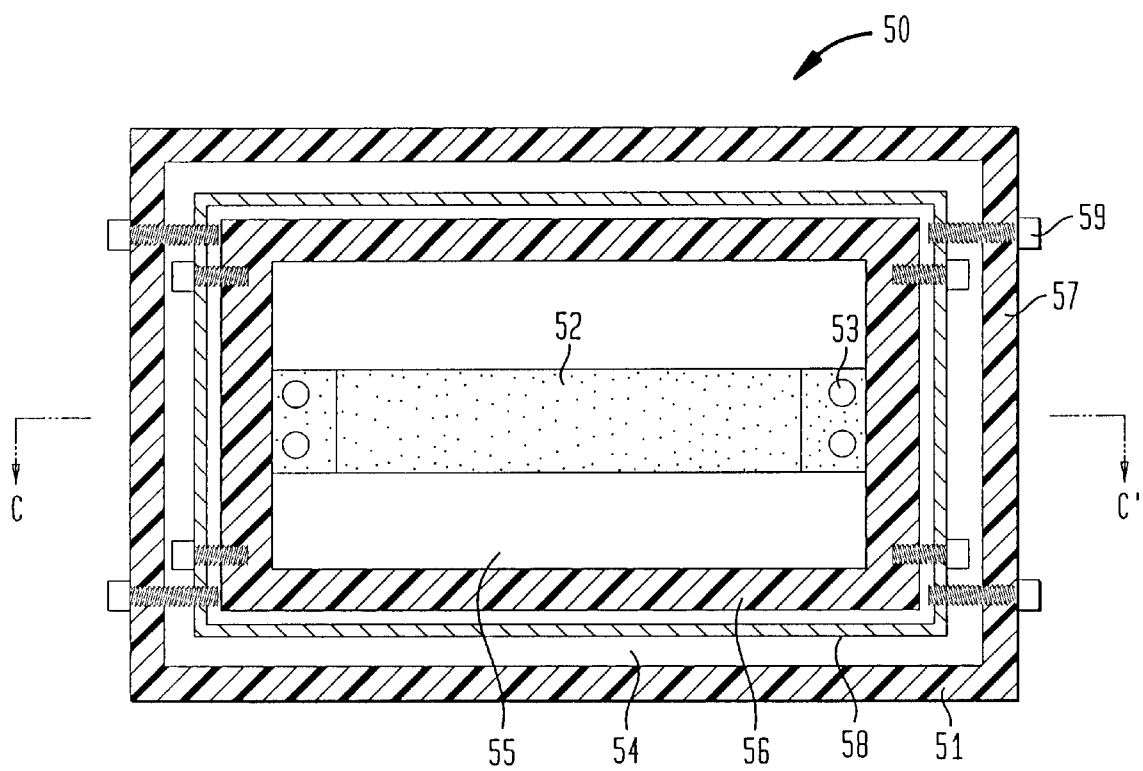
FIG. 10 is a perspective plan view of the liquid crystal display panel of the present invention.
Figure 11:
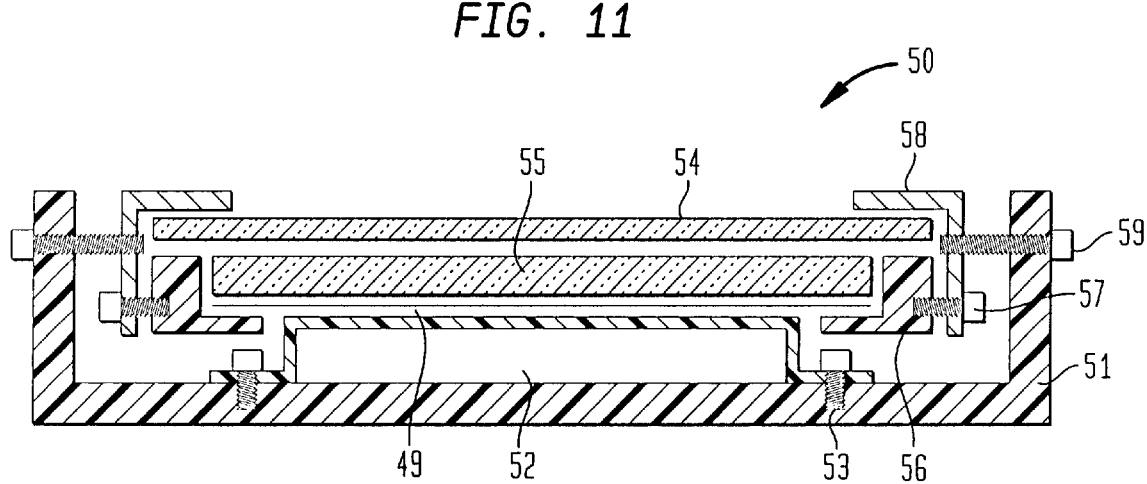
FIG. 11 is a cross sectional view of the liquid crystal display panel of the present invention.

FIG. 10 is a perspective plan view of another embodiment according to the present invention showing a liquid crystal display device. FIG. 11 is a cross sectional view in line C–C' of FIG. 10. In these drawings, a warp preventing means, made of material such as metal of stiffness, with a shape fully capable of maintaining strength is attached to the inside face of an upper lid 51 in a note book PC 50 by a screw 53. In a liquid crystal display module comprising a liquid crystal glass 54, a light guide 55, a plastic frame 56, a metal bezel 58 is attached by a screw 57 to the plastic frame 56 and the upper lid 51 is attached by a screw 59 to the metal bezel 58. The warp preventing means 52 is fixed by a screw 53 to the upper lid 51 and supports the light guide 55 from the back of the liquid crystal display module.

As described above, in a flat surface illumination device and a liquid crystal display panel of the present invention, warp in the light guide can be prevented and a light source with uniform intensity without defect can be obtained because a warp preventing means made of metal material and the like is inserted between the back of the light guide and the frame or the case.

In a flat surface illumination device of the present invention, a warp preventing means comprises a long and narrow zonal thin plate, corresponding to the length in a longitudinal direction of the light guide, in which at least two or more beading processes are performed in the longitudinal direction and/or a perpendicular bending is performed at both ends in the longitudinal direction. As the warp preventing means makes it possible to produce a light and thin flat surface illumination device with an adequate mechanical strength which is fitted for portable products.

In a flat surface illumination device of the present invention, a step-difference process is performed in at least one of the ends of the zonal thin plate in the longitudinal direction. The zonal thin plate makes it possible to produce a light and thin flat surface illumination device of high productivity with an adequate mechanical strength as well as easily attachable to a frame or a case.

In a flat surface illumination device of the present invention, the beading process with the ratio of the width processed by the beading to the width of the zonal thin plate ranging from 1:2.3 to 1:5 is used. The beading process makes it possible to freely select a required mechanical strength according to the width of the zonal thin plate to be permitted. Consequently, independently of the size of the flat surface illumination device and the light guide, freedom of the design can be expanded and, as a result, contribute to shortening of developing period.

In a flat surface illumination device of the present invention, the bending process where the width of a perpendicularly bent section is 1 to 5 times as large as the thickness of the zonal thin plate is used. The bending process makes it possible to freely select a required mechanical strength according to the width of the zonal thin plate to be permitted.

In a flat surface illumination device of the present invention, a frame or a case comprises a concavity receiving the end of a zonal thin plate of a warp preventing means in the position corresponding to an incident end surface section and a reflection end surface section of a light guide and/or an aperture into which the zonal thin plate is inserted. The frame or the case makes it possible for the zonal thin plate of the warp preventing means to be fixed and removed easily and for the number of zonal thin plates of the warp preventing means to be adjusted according to use. Consequently, enlargement of the flat surface illumination device and the light guide can be readily accomplished.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A flat surface illumination device comprising:
    a line light source;
    a light guide guiding light ray from said line light source;
    a plastic frame with an aperture supporting said line light source and said light guide;
    a warp preventing means made of inorganic material attached to the plastic frame in such a manner that it crosses the aperture.

2. A flat surface illumination device according to claim 1, wherein said aperture is formed in such a manner that it includes the area corresponding to a position of center of gravity of the light guide.

3. A flat surface illumination device according to claim 1, wherein said aperture has 25% or more of the area of light guide surface adjacent to the plastic frame.

4. A flat surface illumination device according to claim 1, wherein said aperture has 50% or more of the area of light guide surface adjacent to the plastic frame.

5. A flat surface illumination device according to claim 1, wherein said aperture has 90% or more of the area of the light guide surface adjacent to the plastic frame.

6. A flat surface illumination device according to claim 1, wherein said inorganic material is metal material or ceramic material.

7. A flat surface illumination device according to claim 1, additionally, comprising at least one or more optical sheet in a group including a light condensing sheet, a light reflecting sheet, a light diffusing sheet and a light polarizing sheet.

8. A flat surface illumination device according to claim 1, wherein said warp preventing means comprising a long and narrow zonal thin plate, corresponding to the length in a longitudinal direction of the light guide, in which at least two or more beading processes are performed in the longitudinal direction and/or a perpendicular bending is performed at both ends in the longitudinal direction.

9. A flat surface illumination device according to claim 8, wherein, a step-difference process is performed in at least one of the ends of the zonal thin plate in the longitudinal direction.

10. A flat surface illumination device according to claim 8, wherein, in the beading process, the ratio of the width processed by the beading to the width of the zonal thin plate is 1:2.3 to 1:5.

11. A flat surface illumination device according to claim 8, wherein, in the bending process, the width of a perpendicularly bent section is 1 to 5 times as large as the thickness of the zonal thin plate.

12. A flat surface illumination device according to claim 1, wherein said plastic frame comprises a concavity accommodating the end of the zonal thin plate of the warp preventing means in the position corresponding to the incident end surface section and the reflecting end surface section of the light guide and/or an aperture into which the end of the zonal thin plate is inserted.

13. A flat surface illumination device according to claim 1, wherein said light guide is wedge-shaped.

14. A liquid crystal display panel comprising:

a line light source;

a light guide guiding light ray from the line light source;

a liquid crystal display element selectively transmitting light ray from the light guide;

a plastic frame with an aperture supporting the line light source and the light guide;

a warp preventing means made of inorganic material attached to the plastic frame in such a manner that it crosses the aperture.

15. A liquid crystal display panel comprising:

a line light source;

a light guide guiding light ray from the line light source;

a liquid crystal display element selectively transmitting light ray from the light guide;

a plastic frame with an aperture supporting the line light source and the light guide;

a metal bezel supporting the plastic frame;

a warp preventing means made of inorganic material attached to the metallic bezel in such a manner that it crosses the aperture.

16. A liquid crystal display device comprising:

a line light source;

a light guide guiding light ray from the line light source;

a liquid crystal display element selectively transmitting light ray from the light guide;

a plastic frame with an aperture supporting the line light source and the light guide;

a metallic bezel supporting the plastic frame;

an outer lid supporting the metallic bezel;

a warp preventing means made of inorganic material attached to the outer lid in such a manner that it crosses the aperture.

* * * * *